(12) United States Patent
Yuan

(10) Patent No.: US 10,629,138 B2
(45) Date of Patent: Apr. 21, 2020

(54) MOBILE TERMINAL AND ADJUSTING METHOD THEREOF, AND COMPUTER READABLE STORAGE MEDIUM

(71) Applicant: GUANGDONG OPPO MOBILE TELECOMMUNICATIONS CORP., LTD., Dongguan, Guangdong (CN)

(72) Inventor: Quan Yuan, Guangdong (CN)

(73) Assignee: Guangdong Oppo Mobile Telecommunications Corp. Ltd., Dongguan (CN)

( * ) Notice: Subject to any disclaimer, the term of this patent is extended or adjusted under 35 U.S.C. 154(b) by 0 days.

(21) Appl. No.: 16/031,342

(22) Filed: Jul. 10, 2018

(65) Prior Publication Data

US 2019/0012968 A1  Jan. 10, 2019

(30) Foreign Application Priority Data

Jul. 10, 2017 (CN) .......................... 2017 1 0558360

(51) Int. Cl.
| | |
|---|---|
| G09G 3/34 | (2006.01) |
| H04N 17/00 | (2006.01) |
| G06T 5/00 | (2006.01) |
| H04N 5/232 | (2006.01) |
| H04N 5/217 | (2011.01) |
| H04M 1/725 | (2006.01) |

(52) U.S. Cl.
CPC .......... *G09G 3/3406* (2013.01); *G06T 5/001* (2013.01); *H04M 1/72519* (2013.01); *H04N 5/217* (2013.01); *H04N 5/23293* (2013.01); *H04N 17/002* (2013.01); *G06T 2207/20016* (2013.01); *G09G 2320/0646* (2013.01); *H04M 2201/38* (2013.01); *H04M 2250/52* (2013.01)

(58) Field of Classification Search
CPC ............................... G06T 5/001; G09G 3/3406
USPC ..................................................... 345/87, 173
See application file for complete search history.

(56) References Cited

U.S. PATENT DOCUMENTS

| | | | |
|---|---|---|---|
| 8,023,758 | B2 | 9/2011 | Hung |
| 9,420,188 | B2 * | 8/2016 | Ito .......................... G03B 17/02 |
| 9,883,099 | B2 | 1/2018 | Alexia et al. |
| 2006/0056082 | A1 | 3/2006 | Hung |
| 2009/0043524 | A1 * | 2/2009 | Hung .................... G06T 3/4007 |
| | | | 702/86 |
| 2010/0322532 | A1 | 12/2010 | Jiang |

(Continued)

FOREIGN PATENT DOCUMENTS

| | | |
|---|---|---|
| CN | 101049011 A | 10/2007 |
| CN | 102804227 A | 11/2012 |

(Continued)

OTHER PUBLICATIONS

Supplementary European Search Report in European application No. 18182585.2, dated Oct. 9, 2018.

(Continued)

*Primary Examiner* — Calvin C Ma
(74) *Attorney, Agent, or Firm* — Ladas & Parry LLP

(57) ABSTRACT

A mobile terminal and a method of adjusting a display screen during photographing thereof, and computer readable storage medium are disclosed. The method includes receiving a camera start signal of the mobile terminal, and starting the camera and increasing a brightness of the display screen of the mobile terminal in a preset duration.

14 Claims, 5 Drawing Sheets

(56) References Cited

U.S. PATENT DOCUMENTS

2014/0176731 A1\* 6/2014 Geiss .................. H04N 5/2355
                                                        348/207.1
2016/0309075 A1\* 10/2016 Alexia ................ H04N 5/2256

FOREIGN PATENT DOCUMENTS

| CN | 103795929 A | 5/2014 |
|----|-------------|--------|
| CN | 104580892 A | 4/2015 |
| CN | 106161956 A | 11/2016 |
| CN | 106683638 A | 5/2017 |
| CN | 107517305 A | 12/2017 |
| EP | 2023286 A2 | 2/2009 |

OTHER PUBLICATIONS

International Search Report in international application No. PCT/CN2018/094741, dated Oct. 11, 2018.
Written Opinion of the International Search Authority in international application No. PCT/CN2018/094741, dated Oct. 11, 2018.
CN 101049011 A_English Abstract.
CN106161956 A_English Abstract.

\* cited by examiner

MOBILE TERMINAL AND ADJUSTING METHOD THEREOF, AND COMPUTER READABLE STORAGE MEDIUM

CROSS REFERENCE TO RELATED APPLICATIONS

This application claims the priority benefit of Chinese Patent Application No. 201710558360.7, titled "MOBILE TERMINAL AND ADJUSTING METHOD, PHOTOGRAPHING CONTROL METHOD AND DEVICE THEREOF" and filed on Jul. 10, 2017, the contents of which are incorporated by reference herein in their entirety for all purposes.

TECHNICAL FIELD

The present disclosure relates to the field of terminal technologies, and in particular, to a mobile terminal and a method of adjusting a display screen during photographing thereof, and computer readable storage medium.

BACKGROUND TECHNOLOGY

The camera function has become an indispensable function module in smart terminals such as mobile phones and tablet computers. The built-in camera function in the smart terminal allows the users to record and share their own living conditions and beautiful scenes at any time and anywhere through the smart terminal.

Currently, at the moment of starting the camera of the smart terminal, the peripheral edges of the first few frames of the preview image will appear transient green or purple flashes during performing the image signal processing ISP due to the convergence action of the lens rolling off (Lens Rolloff). That is, there will be green or purple flashes around the preview image before normal display, which will obviously affect the user's photo experience.

DESCRIPTION OF THE DRAWINGS

The above and/or additional aspects and advantages of the present disclosure will become apparent and easily understood from the following description of embodiments in conjunction with the accompanying drawings, in which.

DETAILED DESCRIPTION

Figure 1A:
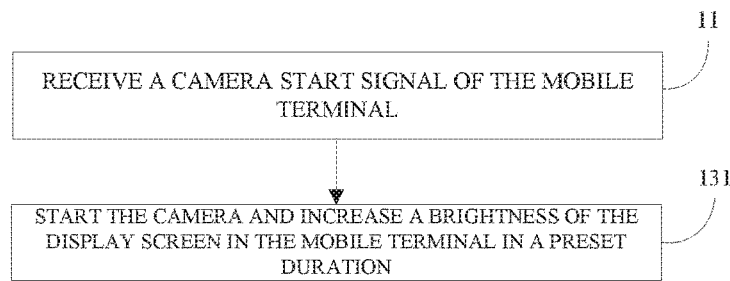
FIGS. 1A and 1B are flowcharts of a method of adjusting a display screen during photographing of a mobile terminal according to an embodiment of the present disclosure.

The embodiments of the present disclosure are described in detail below, and examples of the embodiments are shown in the accompanying drawings, in which the same or similar reference numerals denote the same or similar elements or elements having the same or similar functions throughout. The embodiments described below with reference to the accompanying drawings are exemplary and are intended to explain the present disclosure, but should not be construed as limiting the present disclosure.

Hereinafter, a method of adjusting a display screen during photographing of a mobile terminal, as well as a photographing control method, an apparatus, a terminal, and a computer-readable storage medium thereof according to embodiments of the present disclosure will be described with reference to the accompanying drawings.

Figure 1B:
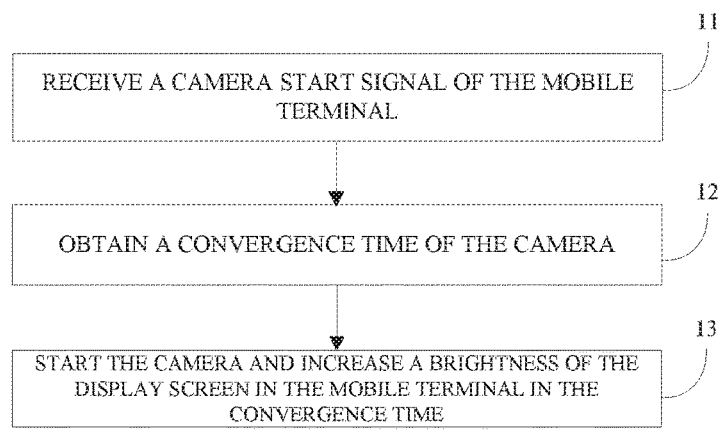

FIGS. 1A and 1B are flowcharts of a method of adjusting a display screen during photographing of a mobile terminal according to an embodiment of the present disclosure.

As shown in FIG. 1A, a method of adjusting a display screen during photographing of a mobile terminal is provided. The method starts, at block 11, where a camera start signal of the mobile terminal is received.

When using the mobile terminal in different application scenarios, the user may send the camera start signal to the mobile terminal in different ways. An example is illustrated as follows.

In a first example, the user can send a camera start signal to the mobile terminal by triggering a camera icon on the mobile terminal corresponding to the camera.

In the second example, the user can send a camera start signal to the mobile terminal through a voice instruction.

In the third example, the user may send a camera start signal to the mobile terminal by inputting a gesture action corresponding to activating of the camera.

The method proceeds to block 131. The camera can be started, and a brightness of the display screen of the mobile terminal can be increased in a preset duration. The preset duration can be determined in advance based on a convergence time of the mobile terminal.

Alternatively, as shown in FIG. 1B, before starting the camera and increasing the brightness, a convergence time of the camera can be obtained at block 12. The convergence time is caused by the convergence action of Lens Rolloff in the camera.

It is to be understood that there are different camera assemblies in different mobile terminals. When starting the cameras in different mobile terminals, the time required for convergence action of Lens Rolloff will be different. That is, the convergence time corresponding to different mobile terminals is different. As a result, the preset durations for different mobile terminals are also different.

At 13, the camera is started, and a brightness of the display screen of the mobile terminal in the convergence time is increased.

It can be understood that during starting of the camera, the first few frames of the preview image in the display screen of the mobile terminal will be subjected to green or purple flashes due to the convergence action of the lens rolling off (Lens Rolloff). If the brightness of the display screen of the mobile terminal is increased during the convergence process, the brightness of the preview image will also be increased. The increase in the brightness of the preview image can cover the few frames with green or purple flashes in the preview image, such that there are no longer green or purple flashes around the preview image of the display in the mobile terminal.

As an exemplary embodiment, a preset brightness of the display screen of the mobile terminal is set in advance in the mobile terminal, and when it is detected that the mobile terminal starts the camera, the brightness of the display screen of the mobile terminal is increased to the preset brightness.

As another exemplary embodiment, for different mobile terminals, the degree of the green or purple flashes in the first few frames of the preview image may also be different due to different camera assemblies in different mobile terminals.

Therefore, in order to eliminate the green or purple flashes around the preview screen image and improve the user's camera experience, in one embodiment of the present disclosure, upon starting the camera and during the convergence action of the lens rolling off (Lens Rolloff), the image information in the preview image may be acquired, the image quality of the preview image may be determined according to the image information, the target brightness of the display in the mobile terminal may be determined according to the image quality of the preview image, and the brightness of the display in the mobile terminal may be increased to the determined target brightness. As a result, the brightness of the preview image can be improved by improving the brightness of the display in the mobile terminal, which can in turn cover the several frames having green or purple flashes in the preview image, so that there are no longer green or purple flashes around the preview image.

Specifically, after the target brightness of the display screen corresponding to the image quality of the preview image is determined, the current brightness of the display screen of the mobile terminal is obtained, the brightness increase required by the display screen of the mobile terminal is determined according to the current brightness and the target brightness, and the brightness displayed in the mobile terminal is increased accordingly.

It should be noted that the brightness increase in the convergence time of the display screen is different due to different image qualities of the preview images.

The higher the image quality of the preview image is, the smaller the brightness increase of the display screen required in the mobile terminal in the convergence time will be; and the lower the image quality of the preview image is, the larger the brightness increase of the display screen required in the mobile terminal in the convergence time will be.

It should be noted that, according to different application scenarios, a variety of different ways may be used to determine the target brightness of the display screen of the mobile terminal according to the image quality of the preview image. Examples are as follows.

As an example, the target brightness of the display screen corresponding to the image quality of the preview image may be determined according to the correspondence relationship between the image quality of the preview image and the brightness of the display screen.

As another example, the target brightness of the display screen corresponding to the image quality of the preview image may be obtained by a preset model that determines the target brightness of the display screen.

As another example, the target brightness of the display screen corresponding to the image quality of the preview image may be calculated according to a function of calculating the brightness of the display screen of the mobile terminal.

In the method of adjusting a display screen during photographing of a mobile terminal according to the embodiments of the present disclosure, a camera start signal of the mobile terminal is received, and a convergence time of the camera is obtained; the camera is then started, and the brightness of the display screen of the mobile terminal is increased in the convergence time. Therefore, by increasing the brightness of the display screen of the mobile terminal, the brightness of the preview screen is increased, which can cover the few frames with green or purple flashes in the preview image, such that there are no longer green or purple flashes around the preview image of the display in the mobile terminal, and the user's user experience can be improved.

Figure 2:
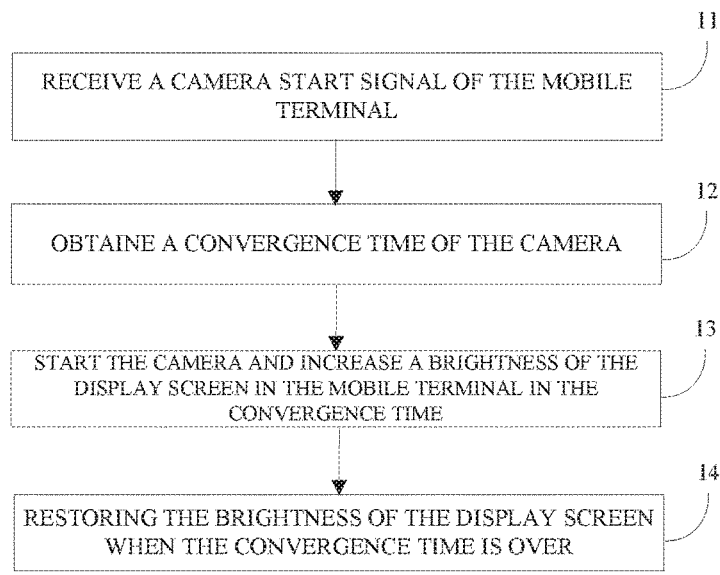
FIG. 2 is a flowchart of a method of adjusting a display screen during photographing of a mobile terminal according to another embodiment of the present disclosure.

Usually when using the mobile terminal, the brightness of the display screen of the mobile terminal generally conforms to the user's usage habits, and can achieve the effect of protecting the eyes. Based on the above embodiments, in order to make the brightness of the display screen of the mobile terminal be consistent with the user's usage habits, the method may further includes, as shown in FIG. 2, after S13, restoring the brightness of the display screen when the convergence time is over (S14).

That is, in this embodiment, before increasing the brightness of the display screen of the mobile terminal in the convergence time, the brightness value of the display screen of the mobile terminal before the camera is started is saved, and when the convergence time is over, i. e., it is monitored that the convergence action of the lens rolling off (Lens Rolloff) is over in the mobile terminal, the brightness of the display in the mobile terminal is restored to the brightness of the display in the mobile terminal before the camera is started.

For example, assume that the brightness of the display screen in the smart phone before the camera of the smart phone is started is A. When the camera is started, the brightness of the display screen in the smart phone is increased to the brightness C in the convergence time. After the convergence time, the brightness of the display screen in the smart phone can be restored to the brightness A. Therefore, when using the camera, the brightness of the display screen of the smart phone can meet the user's usage habits, so as to avoid the influence of the high brightness of the display screen on the eyes and achieve the effect of protecting the eyes.

Figure 3:
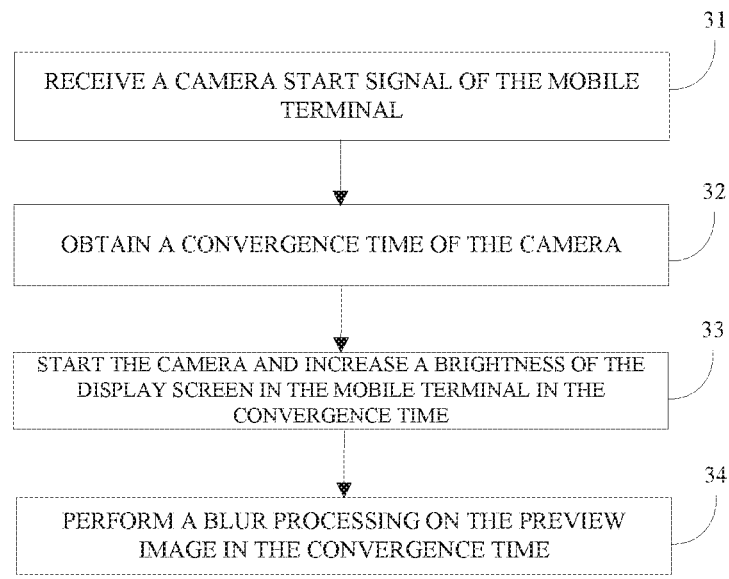
FIG. 3 is a flowchart of a method of adjusting a display screen during photographing of a mobile terminal according to another embodiment of the present disclosure.

FIG. 3 is a flowchart of a method of adjusting a display screen during photographing of a mobile terminal according to an embodiment of the present disclosure.

As shown in FIG. 3, a method includes, at 31, receiving a camera start signal of the mobile terminal, at 32, obtaining a convergence time of the camera, and at 33, starting the camera and increasing the brightness of the display screen of the mobile terminal in the convergence time.

It should be noted that, the foregoing description of blocks 11-13 also applies to 31-33 of the embodiment, and details are not described herein again.

The method may further include, at 34, performing a blur processing on the preview image in the convergence time.

In an embodiment of the present disclosure, the camera is started, and the brightness of the display screen of the mobile terminal can be increased in the convergence time. At the same time, the preview screen may also be blurred to cover the few frames with green or purple flashes in the preview image.

Specifically, during the convergence time, a preview screen is obtained, and an image region with green or purple flashes in the preview screen is obtained. Then, the image region is blurred in combination with other screen regions in the preview screen, so that there are no longer green or purple flashes around the preview image.

It needs to be explained that, according to different application scenarios, a plurality of image blurring algorithms may be used to blur the preview screen. For example, a Gaussian blur algorithm may be used to blur the preview screen. In addition, the multi-level image blur algorithm of neighborhood information may be used to blur the preview image.

Figure 4:
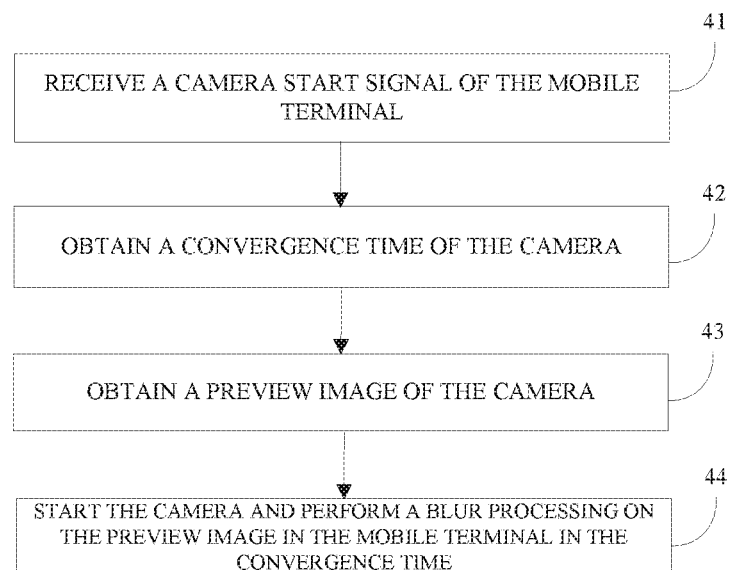
FIG. 4 is a flowchart of a photographing control method of a mobile terminal according to an embodiment of the present disclosure.

FIG. 4 is a flowchart of a photographing control method of a mobile terminal according to an embodiment of the present disclosure.

As shown in FIG. 4, a photographing control method of a mobile terminal is provided. The method includes, at 41, receiving a camera start signal of the mobile terminal.

When using the mobile terminal in different application scenarios, the user may send the camera start signal to the mobile terminal in different ways. An example is illustrated as follows.

In a first example, the user can send a camera start signal to the mobile terminal by triggering a camera icon on the mobile terminal corresponding to the camera.

In the second example, the user can send a camera start signal to the mobile terminal through a voice instruction.

In the third example, the user may send a camera start signal to the mobile terminal by inputting a gesture action corresponding to activating of the camera.

At 12, a convergence time of the camera is obtained. The convergence time is caused by the convergence action of Lens Rolloff in the camera.

It is to be understood that there are different camera assemblies in different mobile terminals. When starting the cameras in different mobile terminals, the time required for convergence action of Lens Rolloff will be different. That is, the convergence time corresponding to different mobile terminals is different.

At 43, a preview image of the camera is obtained. At 44, the camera is started and a blur processing on the preview image in the mobile terminal in the convergence time is performed.

It can be understood that during starting of the camera, the first few frames of the preview image in the display screen of the mobile terminal will be subjected to green or purple flashes due to the convergence action of the lens rolling off (Lens Rolloff). By performing a blur processing to the preview image in the convergence time, it is possible to cover the few frames with green or purple flashes in the preview image, such that the image brightness of the preview image can be increased, and there are no longer green or purple flashes around the preview image of the display in the mobile terminal.

It needs to be explained that, according to different application scenarios, a plurality of image blurring algorithms may be used to blur the preview screen. For example, a Gaussian blur algorithm may be used to blur the preview screen. In addition, the multi-level image blur algorithm of neighborhood information may be used to blur the preview image.

As an exemplary embodiment, when the Gaussian blur algorithm is used to perform Gaussian blur processing on the preview image, an image region containing the green or purple flashes in the preview image may be obtained, and the blur processing may be performed on the image region according to the pixels around the image region to increase the overall brightness of the preview image. Thus, there are no longer green or purple flashes around the preview image of the display screen of the mobile terminal.

According to the photographing control method of the mobile terminal according to the embodiments of the present disclosure, a camera start signal of the mobile terminal is received, and a convergence time of the camera is obtained; the camera is then started, and a preview image is obtained. A blur processing is performed on the preview image in the mobile terminal in the convergence time. Therefore, by performing blur processing on the image, the brightness of the preview screen is increased, such that there are no longer green or purple flashes around the preview image of the display in the mobile terminal, and the user's user experience can be improved.

In order to implement the above embodiment, the present disclosure also provides a device of adjusting a display screen during photographing of a mobile terminal according to an embodiment of the present disclosure.

Figure 5A:
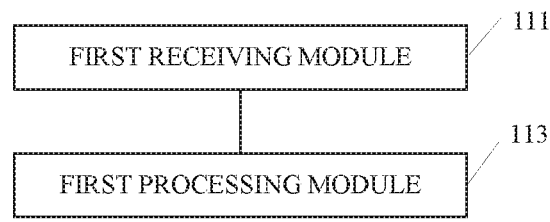
FIGS. 5A and 5B are schematic structural diagrams of an apparatus of adjusting a display screen during photographing of a mobile terminal according to an embodiment of the present disclosure.
Figure 5B:
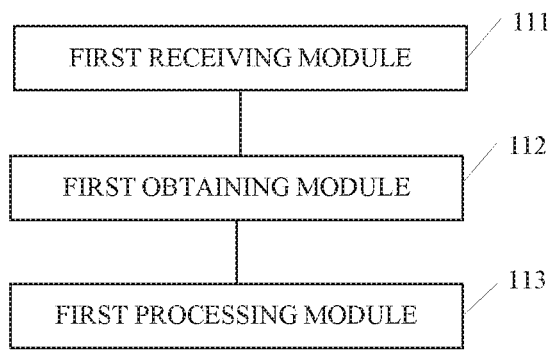

FIGS. 5A and 5B are schematic structural diagrams of a device of adjusting a display screen during photographing of a mobile terminal according to an embodiment of the present disclosure.

As shown in FIG. 5A, the device of adjusting a display screen during photographing of a mobile terminal in an embodiment of the present disclosure may include a first receiving module 111 and a first processing module 113.

The first receiving module 111 is configured to receive a camera start signal of the mobile terminal. The first processing module 113 is configured to start the camera, and increase the brightness of the display screen of the mobile terminal in a preset duration. The preset duration can be determined in advance based on a convergence time of the mobile terminal. The convergence time is caused by the convergence action of Lens Rolloff in the camera.

Alternatively, as shown in FIG. 5B, the device can further include a first obtaining module 112 configured to obtain a convergence time of the camera. In this case, the first processing module 113 is configured to start the camera, and increase the brightness of the display screen of the mobile terminal in the convergence time.

It is to be understood that there are different camera assemblies in different mobile terminals. When starting the cameras in different mobile terminals, the time required for convergence action of Lens Rolloff will be different. That is, the convergence time corresponding to different mobile terminals is different. As a result, the preset durations for different mobile terminals are also different.

It should be noted that, the foregoing explanation of the embodiment of the method of adjusting the display screen during photographing of the mobile terminal also applies to the device of adjusting the display screen during photographing of the mobile terminal in this embodiment. The implementation principle thereof is similar, and is not repeated herein.

According to the device of adjusting a display screen during photographing of a mobile terminal according to the embodiments of the present disclosure, a camera start signal of the mobile terminal is received, and a convergence time of the camera is obtained; the camera is then started, and the brightness of the display screen of the mobile terminal is increased in the convergence time. Therefore, by increasing the brightness of the display screen of the mobile terminal, the brightness of the preview screen is increased, which can cover the few frames with green or purple flashes in the preview image, such that there are no longer green or purple flashes around the preview image of the display in the mobile terminal, and the user's user experience can be improved.

Figure 6:
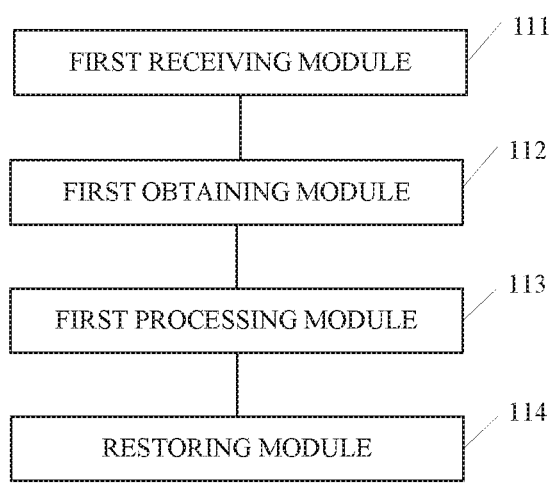
FIG. 6 is a schematic structural diagram of an apparatus of adjusting a display screen during photographing of a mobile terminal according to another embodiment of the present disclosure.

Usually when using the mobile terminal, the brightness of the display screen of the mobile terminal generally conforms to the user's usage habits, and can achieve the effect of protecting the eyes. Based on the above embodiments, in order to make the brightness of the display screen of the mobile terminal be consistent with the user's usage habits, the method may further includes, as shown in FIG. 6 based on FIG. 5, the device may further include a restoring module 114. The restoring module 114 is configured to restore the brightness of the display screen when the convergence time is over.

Before increasing the brightness of the display screen of the mobile terminal in the convergence time, the device is further configured to save the brightness value of the display screen of the mobile terminal before the camera is started, and when the convergence time is over, i. e., it is monitored that the convergence action of the lens rolling off (Lens Rolloff) is over in the mobile terminal, the brightness of the display in the mobile terminal is restored to the brightness of the display in the mobile terminal before the camera is started.

Figure 7:
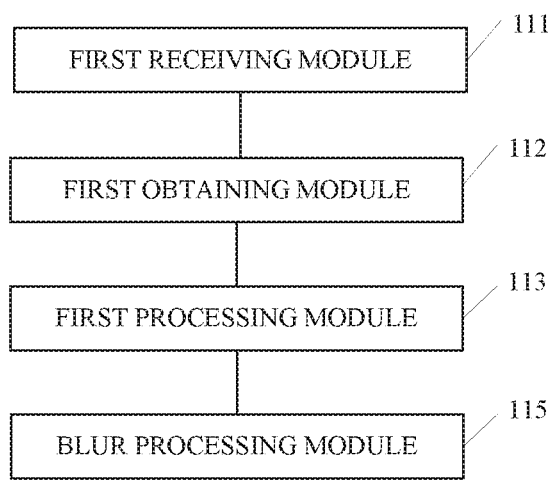
FIG. 7 is a schematic structural diagram of an apparatus of adjusting a display screen during photographing of a mobile terminal according to still another embodiment of the present disclosure.

In an embodiment of the present disclosure, in order to further improve the image quality of the preview image when the camera is started, based on the embodiment shown in FIG. 5, the device may further include, as shown in FIG. 7, a blur processing module 115. The blur processing module 115 is configured to perform a blur processing on the preview image in the convergence time.

It should be noted that, the structure of the blur processing module 115 in FIG. 7 may also be included in the device embodiment shown in FIG. 6, which is not limited in this embodiment.

In order to implement the above embodiments, the present disclosure further provides a photographing control device of a mobile terminal according to an embodiment of the present disclosure.

Figure 8:
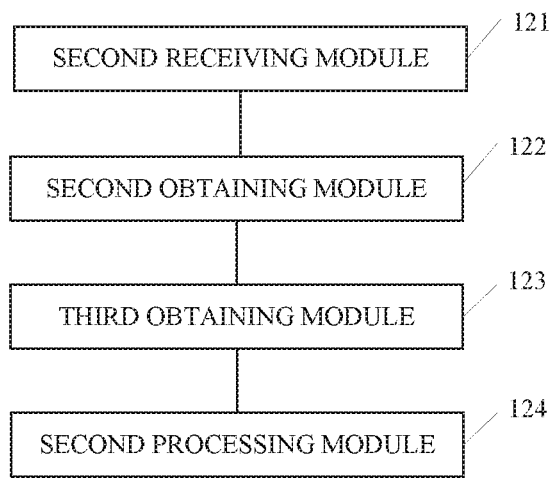
FIG. 8 is a schematic structural diagram of a photographing control apparatus of a mobile terminal according to an embodiment of the present disclosure.

FIG. 8 is a schematic structural diagram of a photographing control device of a mobile terminal according to an embodiment of the present disclosure.

As shown in FIG. 8, the photographing control device of the mobile terminal according to the embodiment of the present disclosure may include a second receiving module 121, a second obtaining module 122, a third obtaining module 123, and a second processing module 124. The second receiving module 121 is configured to receive a camera start signal of the mobile terminal. The second obtaining module 122 is configured to obtain a convergence time of the camera.

The convergence time is caused by the convergence action of Lens Rolloff in the camera.

It is to be understood that there are different camera assemblies in different mobile terminals. When starting the cameras in different mobile terminals, the time required for convergence action of Lens Rolloff will be different. That is, the convergence time corresponding to different mobile terminals is different.

The third obtaining module 123 is configured to obtain a preview image of the camera. The second processing module 124 is configured to start the camera and perform a blur processing on the preview image in the convergence time.

The blur processing is Gaussian blurring.

It should be noted that, the foregoing explanation of the embodiments of the photographing control of the mobile terminal also applies to the photographing control device of the mobile terminal in this embodiment. The implementation principle thereof is similar, and is not repeated herein.

According to the photographing control device of the mobile terminal according to the embodiments of the present disclosure, a camera start signal of the mobile terminal is received, and a convergence time of the camera is obtained; the camera is then started, and a preview image is obtained. A blur processing is performed on the preview image in the mobile terminal in the convergence time. Therefore, by performing blur processing on the image, the brightness of the preview screen is increased, such that there are no longer green or purple flashes around the preview image of the display in the mobile terminal, and the user's user experience can be improved.

In order to implement the above embodiments, the present disclosure also provides a mobile terminal.

Figure 9:
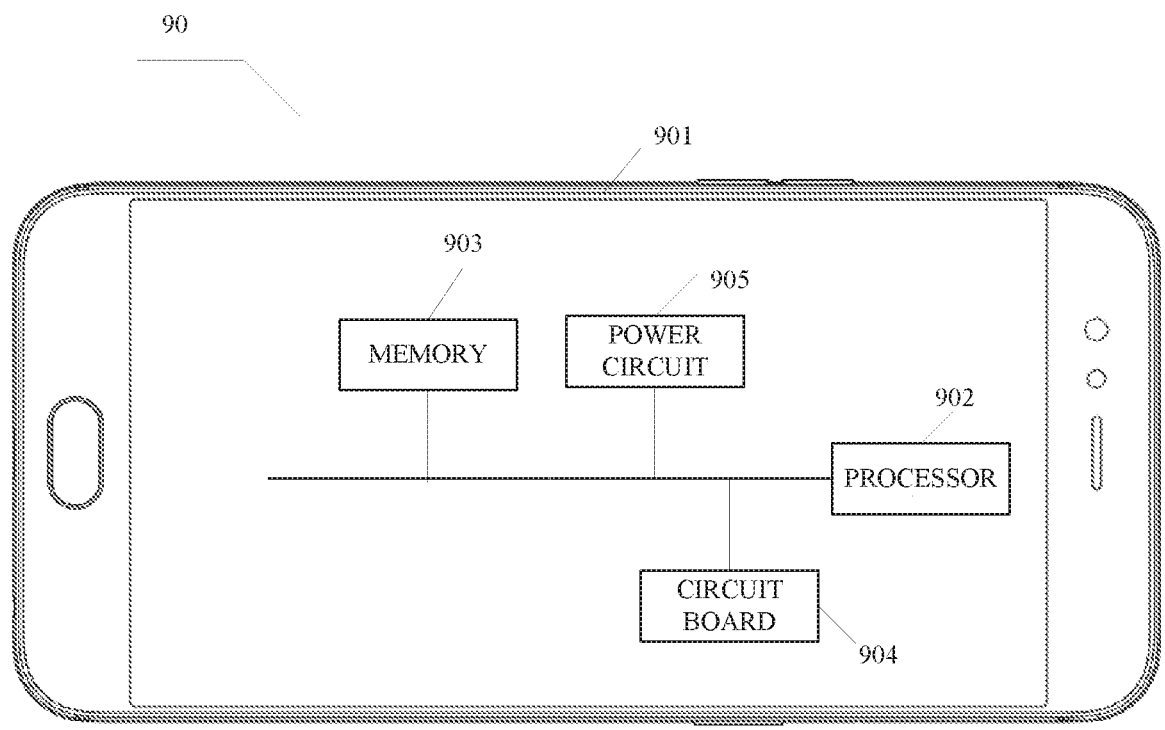
FIG. 9 is a schematic structural diagram of a mobile terminal according to an embodiment of the present disclosure.

FIG. 9 is a schematic structural diagram of a mobile terminal 90 according to an embodiment of the present disclosure.

As shown in FIG. 9, the mobile terminal 90 includes a housing 901, a processor 902, a memory 903, a circuit board 904, and a power circuit 905. The circuit board 904 is disposed inside the space enclosed by the housing 901. The processor 902 and the memory 903 are disposed on the circuit board 904. The power supply circuit 905 is configured to supply power to each circuit or device of the mobile terminal 90. The memory 903 is configured to store executable program codes. The processor 902 is configured to execute a program corresponding to the executable program codes stored in the memory 903, so as to perform a method of adjusting the display screen during photographing of a mobile terminal in the above embodiments.

In addition, the above-mentioned processor 902 in the mobile terminal may also be used to execute the photographing control method of the mobile terminal in the above embodiment.

A computer-readable storage medium on which a computer program is stored, and when the program is executed by a processor, the method of adjusting a display screen during photographing of a mobile terminal of the foregoing embodiment can be implemented.

A computer-readable storage medium on which a computer program is stored, and when the program is executed by a processor, the photographing control method of a mobile terminal of the foregoing embodiment can be implemented.

A computer program product, when the instructions in the computer program product are executed by a processor, executes the foregoing method of adjusting the display screen during photographing of the mobile terminal.

A computer program product, when the instructions in the computer program product are executed by a processor, executes the foregoing photographing control method of a mobile terminal.

In the description of the present specification, the description referring to the terms "an embodiment", "some embodiments", "an example", "a specific example", or "some examples" or the like means specific features, structures, materials, or characteristics described in conjunction with the embodiments or examples and included in at least one embodiment or example of the present disclosure. In this specification, the schematic representation of the above terms does not necessarily have to refer to the same embodiment or example. Furthermore, the particular features, structures, materials, or characteristics described may be combined in any suitable manner in any one or more of the embodiments or examples. In addition, without conflicting with each other, those skilled in the art may combine the different embodiments or examples described in this specification and features of different embodiments or examples.

Furthermore, the terms "first" and "second" are used for descriptive purposes only, and are not to be construed as indicating or implying relative importance or implicitly indicating the number of indicated technical features. Thus, features defined as "first", "second" may explicitly or implicitly include at least one such feature. In the description of the present disclosure, the meaning of "a plurality" is at least two, such as two, three, etc., unless specifically and specifically defined otherwise.

Any process or method described in the flowcharts or described elsewhere herein may be understood mean modules, sections, or portions including codes of executable instructions of for implementing a particular logical function or process. The scope of the preferred embodiments of the present disclosure includes additional implementations in which the functions may be performed in an order that is not shown or discussed, including in a substantially simultaneous manner or in reverse order according to the functions involved. It is understood by those skilled in the art to which the embodiments of the present disclosure belong.

The logic represented in the flowchart or otherwise described herein, for example, may be considered as a sequence listing of executable instructions for implementing logical functions, and may be embodied in any computer-readable medium, so as to be used in a system, device or apparatus (for example, a computer-based system, a system including a processor, or other system that can fetch instructions from, and execute instructions from, an instruction execution system, device or apparatus) or in connection with the instruction execution system, device, or apparatus. For the purposes of this description, a "computer-readable medium" can be any means that can contain, store, communicate, propagate, or transport the program for use by the instruction execution system, device, or apparatus, or in conjunction with the instruction execution system, device, or apparatus. More specific examples (non-exhaustive listings) of a computer-readable medium include the following: an electrical connection (electronic device) having one or more wires, a portable computer disk cartridge (magnetic device), random access memory (RAM), Read-only memory (ROM), erasable programmable read-only memory (EPROM or flash memory), fiber optic devices, and portable compact disk read-only memory (CDROM). In addition, the computer-readable medium may even be paper or other suitable medium on which the program may be printed, as it may be scanned optically, for example, by paper or other media, followed by editing, interpretation, or other suitable process if necessary. The program can then be electronically obtained and stored in computer memory.

It should be understood that portions of the present disclosure may be implemented in hardware, software, firmware, or a combination thereof. In the above embodiments, the methods may be implemented using software or firmware stored in a memory and executed by a suitable instruction execution system. For example, if implemented in hardware, as in another embodiment, one or a combination of the following techniques known in the art may be used: a logic gate for implementing a logic function on a data signal Discrete logic circuits, dedicated integrated circuits with suitable combinational logic gates, programmable gate arrays (PGAs), field programmable gate arrays (FPGAs), etc.

Persons of ordinary skill in the art may understand that all or part of the method of implementing the foregoing embodiment may be instructed by a program to instruct the relevant hardware, and the program may be stored in a computer-readable storage medium. When executed, program may include one or a combination of the method embodiments.

In addition, each functional unit in each embodiment of the present disclosure may be integrated in one processing module, or each unit may exist alone physically; alternatively, two or more units may be integrated in one module. The above integrated module can be implemented in the form of hardware or in the form of a software function module. The integrated module can also be stored in a computer readable storage medium if it is implemented in the form of a software functional module and sold or used as an independent product.

The above-mentioned storage medium may be a read-only memory, a magnetic disk or an optical disk. Although the embodiments of the present disclosure have been shown and described above, it is to be understood that the above embodiments are exemplary and not to be construed as limiting the present disclosure. Those skilled in the art may, within the scope of the present disclosure, be able to obtain changes, modifications, substitutions and variations of the embodiments.

The invention claimed is:

1. A method of adjusting a display screen during photographing of a mobile terminal, comprising:
   receiving a camera start signal of the mobile terminal; and
   starting the camera and increasing a brightness of a preview image of the mobile terminal in a preset duration,
   wherein the preset duration is determined based on a convergence time of the camera and the convergence time is caused by a convergence action of Lens Rolloff in the camera.

2. The method of claim 1, further comprising:
   restoring the preview image brightness of the when the preset duration is over.

3. The method of claim 1, further comprising:
   performing a blur processing on the preview image in the preset duration.

4. The method of claim 1, wherein increasing the brightness of the preview image of the mobile terminal in a preset duration further comprises:
   obtaining a current brightness of the preview image;
   comparing the current brightness to a target brightness and calculating a brightness difference; and
   increasing the brightness of the preview image according to the brightness increase.

5. The method of claim 4, wherein the target brightness is determined according to an image quality of the preview image obtained in the preset duration.

6. A mobile terminal, comprising: a housing, a processor, a memory, a circuit board, and a power circuit, wherein the circuit board is disposed inside a space enclosed by the housing, the processor and the memory are disposed on the circuit board; the power supply circuit is configured to supply power to each circuit or device of the mobile terminal; the memory is configured to store executable program codes; the processor is configured to execute a program corresponding to the executable program codes stored in the memory, so as to perform a method of adjusting a display screen during photographing of a mobile terminal, wherein the method comprises:

receiving a camera start signal of the mobile terminal; and starting the camera and increasing a brightness of a preview image of the mobile terminal in a preset duration, wherein the preset duration is determined based on a convergence time of the camera and the convergence time is caused by a convergence action of Lens Rolloff in the camera.

7. The mobile terminal of claim 6, wherein the method further comprises:

restoring the brightness of the preview image when the preset duration is over.

8. The mobile terminal of claim 6, wherein the method further comprises:

performing a blur processing on the preview image in the preset duration.

9. The mobile terminal of claim 6, wherein increasing the brightness of the preview image of the mobile terminal in the preset duration further comprises:

obtaining a current brightness of the preview image;

comparing the current brightness to a target brightness and calculating a brightness difference; and increasing the brightness of the preview image according to the brightness increase.

10. The mobile terminal of claim 9, wherein the target brightness is determined according to an image quality of the preview image obtained in the preset duration.

11. A computer-readable storage medium having stored thereon a computer program, wherein the computer program is configured to be executed by a processor to implement a method, the method comprising:

receiving a camera start signal of a mobile terminal; and starting the camera and increasing a brightness of a preview image of the mobile terminal in a preset duration;

wherein the preset duration is determined based on a convergence time of the camera and the convergence time is caused by a convergence action of Lens Rolloff in the camera.

12. The computer-readable storage medium of claim 11, wherein the method further comprises:

restoring the brightness of the preview image when the preset duration is over.

13. The computer-readable storage medium of claim 11, wherein the method further comprises:

performing a blur processing on the preview image in the preset duration.

14. The computer-readable storage medium of claim 11, wherein increasing the brightness of the preview image of the mobile terminal in a preset duration further comprises:

obtaining a current brightness of the preview image;

comparing the current brightness to a target brightness and calculating a brightness difference; and increasing the brightness of the preview image according to the brightness increase.

* * * * *